United States Patent

Washbourn et al.

[11] Patent Number: 4,546,297
[45] Date of Patent: Oct. 8, 1985

[54] ELECTRIC ACTUATORS

[75] Inventors: Jack Washbourn, Chippenham; Howard F. Cogan, Leire, both of England

[73] Assignee: Westinghouse Brake & Signal, Wiltshire, England

[21] Appl. No.: 607,634

[22] Filed: May 7, 1984

[30] Foreign Application Priority Data

| May 12, 1983 [GB] | United Kingdom | 8313102 |
| Jun. 17, 1983 [GB] | United Kingdom | 8316544 |
| Jun. 17, 1983 [GB] | United Kingdom | 8316545 |

[51] Int. Cl.[4] ............................................. H02K 7/10
[52] U.S. Cl. .................................... 318/372; 318/254; 318/466; 318/362; 318/371; 318/273; 318/269; 310/80; 310/83; 188/162
[58] Field of Search ............... 318/371, 372, 362, 301, 318/261, 269, 273, 614; 310/77, 80, 83; 180/170; 188/162, 158, 74, 33; 246/182 R; 192/1, 116.5, 147, 140; 267/168

[56] References Cited

U.S. PATENT DOCUMENTS

| 212,688 | 2/1879 | Hansell | 267/168 X |
| 874,219 | 12/1907 | Mahoney | 188/162 X |
| 2,418,351 | 4/1947 | Jackson | 318/261 |
| 2,479,019 | 8/1949 | Ochtman | 310/83 |
| 2,482,464 | 9/1949 | Chapman | 310/83 |
| 2,756,014 | 7/1956 | Leibfried | 267/170 X |
| 3,013,624 | 12/1961 | De Remer et al. | 188/162 X |
| 3,039,758 | 6/1962 | Gratzmuller | 267/168 X |
| 3,159,758 | 12/1964 | Hemperly et al. | 310/83 |
| 3,399,879 | 9/1968 | Hojo et al. | 267/178 |
| 3,659,683 | 5/1972 | Betzing | 188/162 |
| 4,364,111 | 12/1982 | Jocz | 318/466 X |
| 4,393,319 | 7/1983 | Bock | 310/80 |
| 4,445,075 | 4/1984 | Fry | 318/434 |
| 4,463,291 | 7/1984 | Usry | 318/254 |

Primary Examiner—William M. Shoop, Jr.
Assistant Examiner—Shik Luen Paul Ip
Attorney, Agent, or Firm—Larson and Taylor

[57] ABSTRACT

An electric actuator having an output member movable into and out of a force-exerting position, electric motor means operable both to move the output member to and from its force-exerting position and, when the output member is in that position, to control a spring system to generate a required output force on the output member, and means for withholding the spring system from generating a force on the output member until the output member is determined as being in its force-exerting position.

13 Claims, 3 Drawing Figures

ELECTRIC ACTUATORS

This invention relates to electric actuators and more particularly, to such actuators having an electric motor which is operable to control a spring system to generate an output force on an output member.

One of the problems of such actuators is that, where there is normally some clearance between the output member and the part to which the output member is to apply the output force (as, for example, in a railway-vehicle braking system), loss of available spring force is experienced by the extension of the spring system to move the output member to engage the part to which the output force is to be applied. To achieve any desired maximum output force, the spring system has therefore to be larger than would otherwise be necessary to allow for this extension.

To obviate this disadvantage, the present invention provides an electric actuator having an output member movable into and out of a force-exerting position, electric motor means operable both to move the output member to and from its force-exerting position and, when the output member is in that position, to control a spring system to generate a required output force on the output member, and means for withholding the spring system from generating a force on the output member until the output member is determined as being in its force-exerting position.

There may be provided a housing which holds the spring system housed and inoperative on the output member until the output member is determined as being in its force-exerting position.

The output member may constitute a final output member between which and a second output member is a collapsible spring collapse of which is indicative of the final output member being in is force-exerting position. In this case, the collapse of the spring between the two output members may initiate operation of the electric motor to cause the spring system to generate an output force on the second output member for transmission to the final output member. There may then be trapped between the spring and the final output member a control member which is threadedly-engaged with the second output member, such threaded engagement causing relative rotation of the control member and the second output member when the second output member moves relative to the final output member as the spring between them collapses and this consequent relative rotation initiates operation of the electric motor to cause the spring system to generate an output force on the second output member. The spring system may include a power spring and a control spring, the control spring exerting a force which is detractive from the force exerted by the power spring and the electric motor controlling the force exerted by the control spring and, thereby, the residual force permitted to be exerted by the power spring on the output member as the output force. When there is provided the housing as above described, the second output member may be separate from the housing and be threadedly-engaged with a part resiliently loaded in a direction tending to clutch said part to the housing to allow transmission of the output force generated by the spring system from the housing through said part to the second output member. With such an arrangement, there may be provided a second spring which, through the second output member and the collapsible spring, urges the final output member towards its force-exerting position, the second spring being the stronger. The part threadedly-engaged with the second output member may be a nut having means for supporting it for rotation relative to the second output member, the nut normally being held against such rotation but when freed to rotate is rotated by the second spring thereby to move the final output member towards its force-exerting position. The nut may be arranged to be driven by a second electric motor in a direction opposite to that in which it is rotated by the second spring, the second electric motor normally being clutched against operation to hold the nut against rotation but being de-clutched and operable to drive the second output member in a direction to carry with it the final output member away from its force-exerting position and thereby re-compressing the second spring.

Alternatively, the spring system may be constituted by a single power spring and the electric motor arranged to vary the length of the power spring to cause it to exert a correspondingly varying output force. When there is provided the housing, the housing may constitute the second output member.

Embodiments of the present invention will now be described in greater detail, by way of example only, with reference to the accompanying drawings of which:

Figure 2:
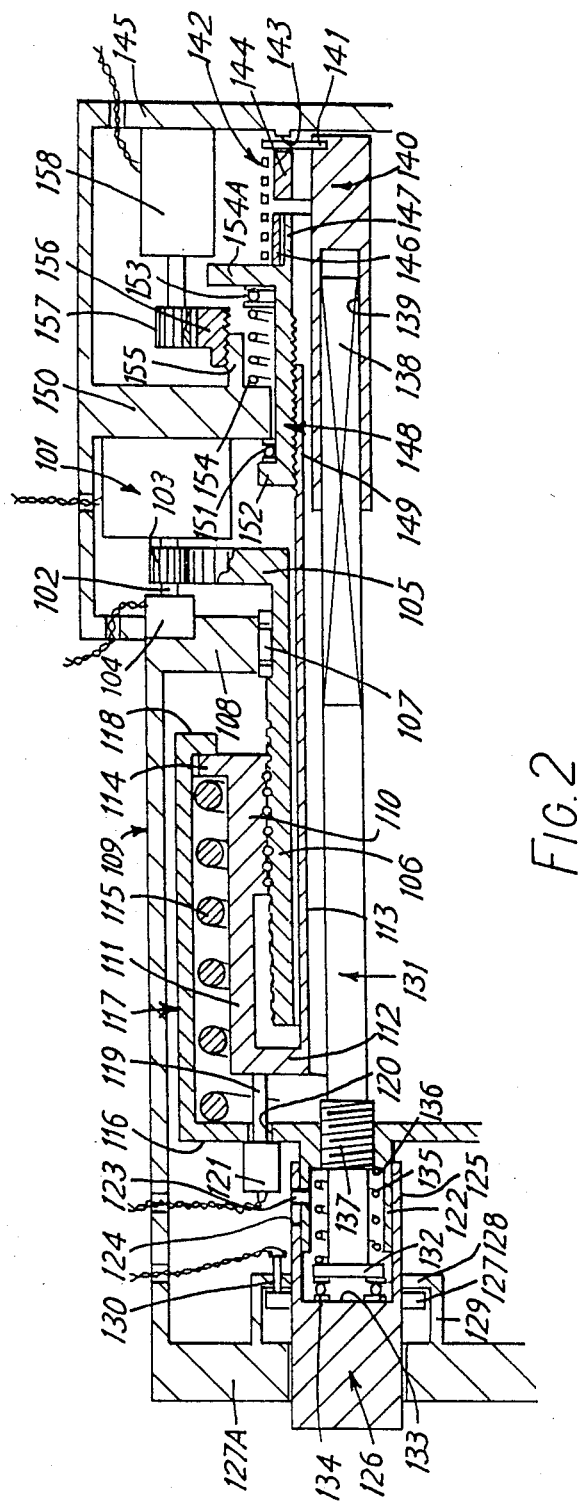
FIG. 2 is a similar view of another form of actuator.
Figure 3:
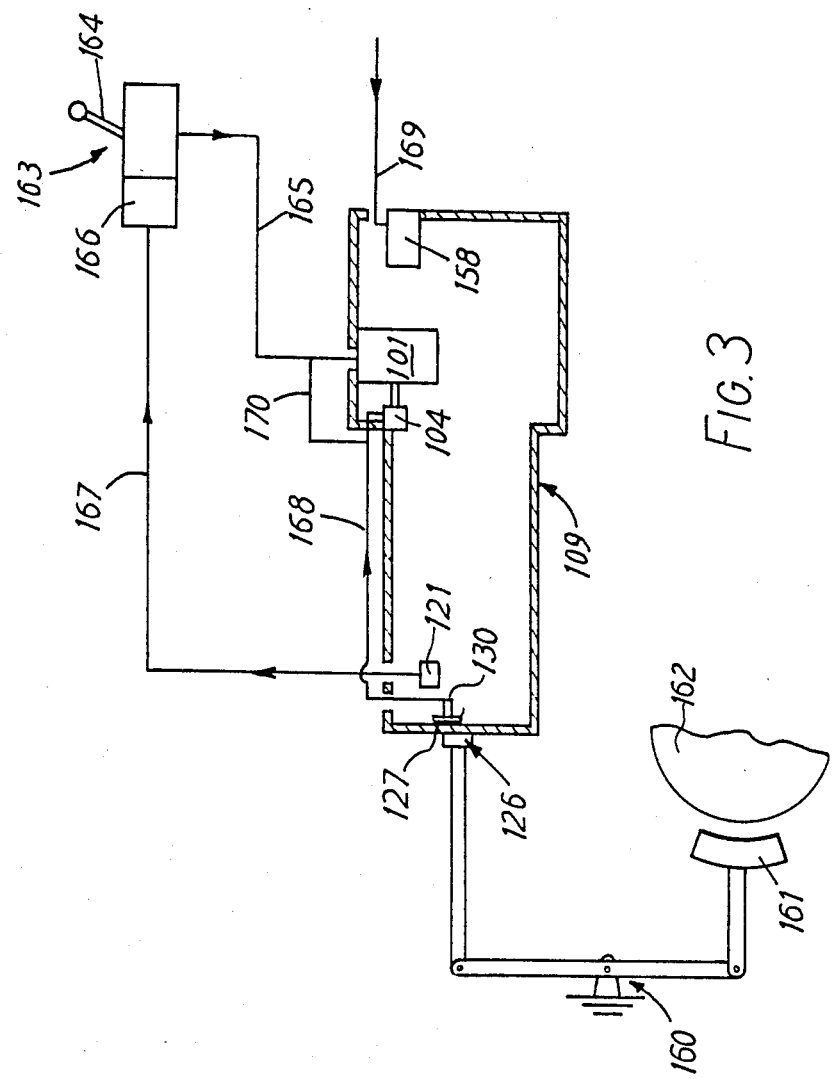

FIG. 3 the electrical control circuit of the actuator of FIG. 2 incorporated into a railway brake system.

The following embodiments of the invention will both be described in the context of railway brake actuators. It will, however, be understood that the concepts incorporated in the following described embodiment can equally well be used in brake actuators for other forms of vehicles. Indeed, they are applicable also to brake actuators for other forms of rotating machinery or, generally, to actuators for generating a force for other than braking usage.

Figure 1:
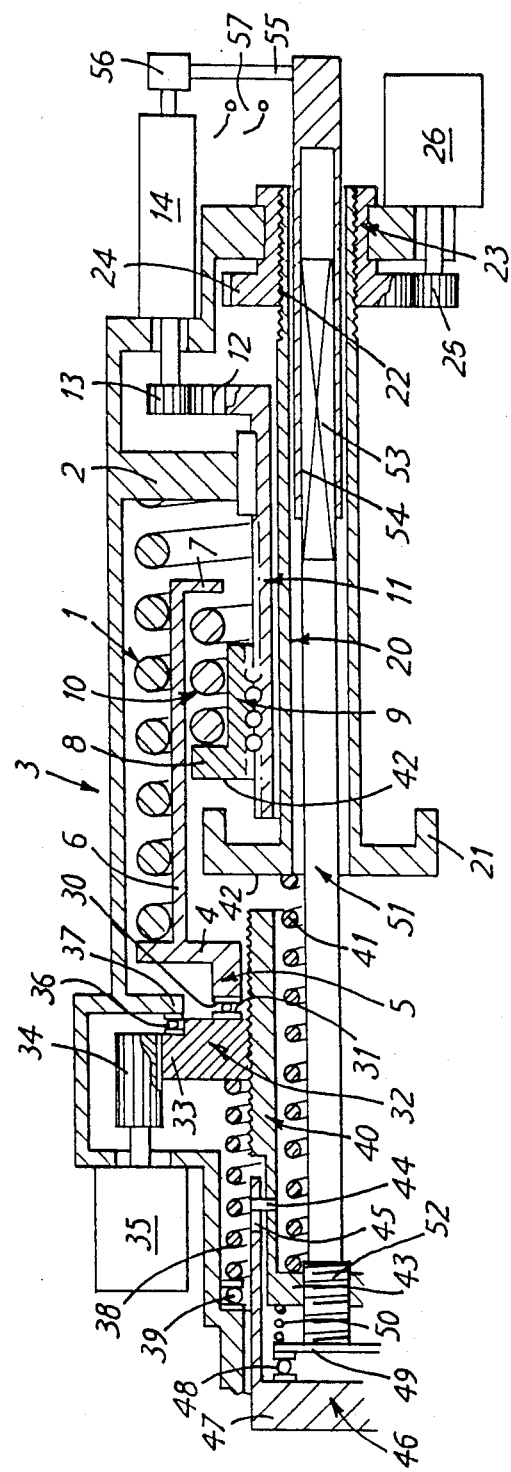
FIG. 1 is a longitudinal, generally half-section, view of one form of actuator.

Referring to FIG. 1, the force-exerting actuator has a power spring 1 which extends between an intermediate wall 2 of a housing 3 of the actuator and a flange 4 carried on the end of an output member 5. Extending axially from the flange 4 is a cylindrical extension 6 which lies co-axially with the power spring 1 and, at its end remote from flange 4, has a radially inwardly projecting second flange 7.

Trapped between the second flange 7 and a radially outwardly projecting flange 8 on a nut 9, is a control spring 10. The nut 9 is threadedly engaged with a ball-screw 11 which is in the form of a sleeve which passes through the wall 2 of the housing 3. Secured to the end of the ball-screw sleeve 11 on the opposite side of the wall 2 from the nut 10, is a gear 12 meshed with a pinion 13 arranged to be driven by an electric stepping motor 14.

As so far described, the actuator operates as follows:

The actuator is shown in FIG. 1 in its "release" position. In this position, the control spring 10 is sufficiently compressed that it exerts on the flange 7 a sufficient force totally to balance the force exerted by the power spring 1. Thus, the power spring 1 is prevented from exerting any force on the output member 5. From this position, the stepping motor 14 can be operated to rotate pinion 13 and, therefore, through gear 12, the ball-screw sleeve 11 in such a direction as to wind the nut 9 towards the left (as viewed in FIG. 1). Such movement of the nut 9 will allow the control spring 10 to expand and thus reduce the force which it exerts on the power spring 1. By such reduction, the detraction which the control spring 10 makes from the force exerted by the power spring 1 is reduced and the power spring 1 thus is freed to exert on the output member 5 a force which is the difference between the total force of which the power spring 1 is capable of exerting and the reduced force which the control spring 10 exerts in opposition to the power spring 1. It will thus be seen that, by controlling the operation of the stepping motor 14, the nut 9 can be positioned to control the force exerted by the control spring 10 and, therefore, the residual force allowed to be exerted by the power spring 1 on the output member 5.

In the context of railway braking equipment, the electric motor 14 would be controlled to determine the degree of braking required to be effected and this determined degree would be effected by the output member 5 being arranged to be operative on the braking members of the brake equipment.

One characteristic sometimes required, in railway braking equipment, is that the maximum braking force allowed to be exerted shall be dependent on the loading of the railway vehicle. The facility to provide for this requirement is provided in the actuator of FIG. 1 by the following parts:

Passing through the ball-screw sleeve 11 is a shaft 20 which, at its left-hand end as seen in FIG. 1, has a cup-shaped flange 21, and, adjacent its right-hand end, has a threaded portion 22. Engaged with the portion 22 is a second nut 23 integral with a gear wheel 24 meshed with a pinion 25, and arranged to be driven by a second electric stepping motor 26. The motor 26 is arranged in a suitable electric circuit to be operated to an extent dependent upon the load of the vehicle on which the actuator is used. Variable operation of the motor 26 in dependence upon the load will, through pinion 25, gear wheel 24 and second nut 23 variably axially position the flange 21. The flange 21 being located in the axial path of the nut 9, the flange 21 will act as an adjustable stop variably to limit the maximum movement of the nut 9 and, therefore, the minimum value which the control spring 10 is allowed to detract from the force exerted by the power spring 1. Thus, the maximum residual force allowed to be exerted by the power spring 1 on the output member 5 (and, therefore, the maximum braking force which can be exerted) is controlled in dependence upon the loading of the vehicle.

The left-hand end face of the output member 5 is formed with a clutch face 30 engageable with a complementary clutch face 31 on a nut 32. The periphery of the nut 32 is formed as a gearwheel 33 meshed with a pinion 34 arranged to be driven by a third electric motor 35. Carried by the nut 32 in the region of the gearwheel 33 is a bearing 36 by which the nut 32 can rotationally engage a radially inwardly projecting wall 37 of the housing 3.

The nut 32 is urged to the right by a spring 38 effective between the nut 32 and a thrust bearing 39 carried by the housing 3.

The nut 32 is threadedly-engaged with a reversible thread with a tubular member 40 which co-axially houses a spring 41 effective between the left-hand end face 42 of the cup-shaped flange 21 on the shaft 20 and a radially inwardly-projecting flange 43 of the tubular member 40. The tubular member 40 carries a pin 44 which projects into an axially extending slot 45 in a tubular final output member 46.

The left-hand end of the final output member 46 is closed by an end face 47 which carries a further thrust race 48 resiliently engaged with a flange 49 which is trapped between the thrust race 48 and a spring 50 extending between the flange 49 and the flange 43 of the member 40. The flange 49 is formed on the end of a shaft 51 which passes through the actuator and, particularly, through the tubular shaft 20. Towards its left-hand end, the shaft 51 has a threaded portion 52 which is threadedly engaged with the internal periphery of the flange 43 of the tubular member 40. Adjacent its right-hand end the shaft 51 has a squared portion 53 slidably engaged by a complementary-shaped squared tube 54. At its right-hand extremity, the tube 54 carries an operating arm 55 arranged to control operation of a mechanical clutch 56 of the stepping electric motor 14. Positioned so as to be engaged by the operating arm 55 are a pair of electrical contacts 57.

The full operation of the actuator of FIG. 1 is as follows:

As observed above, the actuator, is shown in FIG. 1 in the "brake-released" condition. In this condition, the clutch 56 is "made" to prevent rotation of the stepping motor 14 and the control spring 10 is thus held compressed equally to hold compressed the power spring 1. There is, therefore, no output force exerted by these combined springs on the output member 5 as is explained above. Also, the integral clutch in the electric motor 35 is energised thereby holding the nut 32, the tubular member 40, the final output member 46 and the shaft 51 all in their positions as shown in FIG. 1.

To apply the brakes, the integral clutch in the electric motor 35 is de-energised and thereby released. Such release of this clutch allows the spring 41 to extend taking with it the tubular member 40 (spinning the nut 32 on its bearing 36 through the threaded engagement of the member 40 with the nut 32), the final output member 46 (through the spring 50, flange 49 and thrust bearing 48) and the shaft 51 (by its flange 49 being trapped between the spring 50 and the thrust bearing 48). Such movement of all of these parts will continue until the brakes are engaged. When such engagement occurs, the final output member 46 will be unable to travel any further. As the member 46 cannot now move any further, the spring 41, being the stronger, will compress the spring 50. To effect this, the shaft 51 will be rotated on the thrust bearing 49 by virtue of the threaded engagement of the flange 43 with the threaded portion 52 of the shaft 51. In such compression of the spring 50, the tubular member 40 can move axially of the final output member 46 by virtue of the pin-and-slot 44/45 connection between these two members.

Rotation thus caused of the shaft 51 causes the squared tube 54 similarly to be rotated. This rotation of the squared tube 54 causes, firstly, the clutch 56 to be freed thus to free the motor 14 for operation and, secondly, by making the contacts 57, energises the motor 14. In the manner above described with reference to FIG. 1, the motor 14 can now be operated to reduce the force exerted by the control spring 10, thus reducing the detraction which this spring 10 makes from the force exerted by the spring 1. Thus, the differential force is exerted on the output member 5 which is first moved to engage the clutch 30/31 and, thereafter, the force exerted on the output member 5 is transmitted through the nut 32, the tubular member 40, its flange 43, the threaded portion 52 of the shaft 51, the flange 49 of the shaft 51, and the thrust bearing 49, to the end face 47 of the final output member 46. Thus, a braking force determined by the degree of operation of the stepping motor 14 is impressed on the final output member 46 and the previously-engaged brakes.

Subsequently to release the brakes, the stepping motor 14 is first operated to re-compress the control spring 10. Such re-compression will, as above described with reference to FIG. 1, remove the braking force exerted on the output member 5 and will disengage the clutch 30/31. In this process, the nut 32 will be restored to its position in which its thrust bearing 36 re-engages the wall 37 of the housing 3 carrying back with it the tubular member 40 and the final output member 46 as the previous stretch in the brake rigging recovers under relaxation of the previously-applied braking forces. When all the braking force has finally been relieved by the above actions, the spring 43 is freed to re-expand. This re-expansion of spring 43 rotates the shaft 51 in the direction opposite to which it had been rotated during the brake application causing, through the squared tube 54 and the operating arm 55, the contacts 57 to be broken and the clutch 56 to be re-made. Hence, further operation of the motor 14 is prevented and the parts of the actuator controlled by the electric motor 14 are locked in their "brakes released" condition. The breaking of the contacts 57 also causes a pre-determined degree of operation of the electric motor 35. Such operation rotates the nut 32 and, thereby, moves the tubular member 40 a predetermined axial distance to the right. Through the pin-and-slot connection 44/45, such movement of the member 40 carries with it the final output member 46 to give a pre-determined brake clearance. The axial movement of the members 40 and 46 in this setting of the brake clearance, re-compresses the spring 41.

The parts of the actuator have now all been returned to a "brakes released" condition with a pre-determined amount of brake clearance. Hence, it will be seen that the right-hand parts of the actuator are also, effectively, a slack adjuster for, irrespective of whatever may have been the degree of wear of the brakes in successive brake applications, the brake clearance is always adjusted during a brake-release operation to a pre-determined value.

Should there be an electric-power failure, a brake application is automatically effected. De-energisation of the integral clutch of the motor 35 will allow the spring 41 to apply the brakes. Thereafter, the clutch 56 will be "broken" upon collapse of the spring 50 and the clutch 30/31 "made" (both in the manner above described) so that the spring arrangement 1/10 is clutched to the final output member 46 to allow the exertion of braking forces.

It will be noted that the motor 26, pinion 25, gearwheel 24, tubular shaft 20 and flange 21 provide the facility for load limitation of the maximum braking forces allowed in the manner described above.

Referring to FIG. 2, the actuator comprises an electric motor 101 of which the output shaft 102 passes through a pinion 103 secured on the shaft 102, to an electrially-operated clutch 104. The pinion 103 is meshed with a gearwheel 105 secured to one end of a ball-screw tube 106 which is mounted for rotation in bearing 107 in an intermediate wall 108 of the actuator housing 109.

Threadedly engaged with the ball-screw tube 106 is a nut 110 having a leftwardly-extending tubular extension 111 at the right-hand extremity of which is a radially-inwardly projecting flange 112. From the inner periphery of the flange 112 extends rightwardly a tube 113 lying co-axially with the ball-screw tube 106.

Projecting radially outwardly from the end of the nut 110 remote from the tubular extension 111, is a second flange 114. The flange 114 is abutted by one end of a spring 115 the other end of which abuts the end wall 116 of a spring housing 117 which constitutes the output member of the actuator. The housing 117 has, at its end remote from the end wall 116, an inwardly-projecting flange 118. As can be seen from FIG. 1, the spring 15 is trapped in the housing 117 by the flange 114 on the nut 110 being trapped between the spring 115 and the flange 118 of the spring housing 117. Extending from the flange 112 on the nut 110 is a shaft 119 which passes through a bore 120 in the end wall 116 of the spring housing 117, to a transducer 121 mounted on that end wall 116. The transducer 121 measures the force exerted by the spring 115 by measuring its degree of compression as will be hereinafter seen.

The end wall 116 of the spring housing 117 is provided with an axially-projecting tubular extension 122.

The tubular extension 122 carries a pin 123 which extends into a slot 124 in a tubular extension 125 of a final output member 126. Hence, the pin 123 and the slot 124 constitute a pin-and-slot connection 123/124 between the two tubular extensions 122 and 125 which permits relative axial movement between the two whilst preventing relative rotation between them.

Surrounding the final output member 126 is a friction ring 127. This ring frictionally engages the member 126 but, under sufficient force, can be slid either way axially of the final output member 126. The friction ring 127 is housed between the end wall 127 of the actuator housing 109 and a flange 128 on the end of a tubular projection 129 which projects inwardly of the actuator housing 109. Hence, the degree of movement of the friction ring 127 is limited to between the end wall 127 and the flange 128. Should the final output member 126 be moved a greater distance than this limited movement, then the friction ring 127 being thereby caused to engage the end wall 127 or the flange 128, as the case may be it will be caused frictionally to slide on the final output member 126. Mounted in the flange 128 is a pair of electrical contacts 130 located so as to be "made" by the friction ring 127 when it abuts the flange 128.

Projecting co-axially within the tubular extensions 122 and 125 is one end of a shaft 131. At its extremity of this end the shaft 131 has a flange 132 between which and the internal face 133 of the final output member 126, is a thrust bearing 134. Also, extending between this flange 132 on the opposite side from the bearing 134, is a spring 135 of which one end abuts the flange 132 and the other abuts an internal end face 136 of the end wall 116 of the spring housing 117. By this spring 135, the shaft 131 is urged to the left to engage its flange 132 with the thrust bearing 134.

The shaft 131 passes through the end wall 116 of the spring housing 117 and is there threadedly engaged with the end wall 116 by means of the threaded portion 137 of the shaft 131.

The shaft 131 passes co-axially through the tube 113 of the nut 110 and, at its end portion 138 remote from its flange 132, is square in cross-section. The end portion 138 of the shaft 131 is received in a similarly cross-sectioned bore 139 in a clutch-operating part 140. This part 140 receives the tail 141 of a square-section wire spring 142, which passes through a circumferential slot 143 in a tubular boss 144 extending inwardly of the actuator housing 109 from its end wall 145. The spring 142 is wrapped-around a cluch part 146 so that the spring 142 and part 146 constitutes a one-way rotational clutch 142/146 by which the clutch-operating part 140 is clutched for rotation with the clutch part 146 for rotation therewith in one direction but is free to rotate relative to the clutch part 146 in the opposite direction.

The clutch part 146 is in the form of an internally-splined sleeve, the splines of which are interdigitated with corresponding splines on a hub 147 of a second nut 148. Thus, the clutch part 146 can move axially with respect to the nut 148 but is non-rotationally engaged therewith.

The nut 148 is threadedly-engaged with a threaded end portion 149 of the tube 113. The nut 148 is supported for rotation in a second intermediate wall 150 of the actuator housing 109 by a first thrust bearing 151 located between a flange 152 on the nut 148 and one side of the intermediate wall 150 and by a second thrust bearing 153 loated between a second flange 154 on the nut 148 and a spring 154 one end of which abuts the second bearing 153 and the other side of the intermediate wall 150 of the housing 109.

Surrounding the spring 154 is a threaded boss 155 projecting from the intermediate wall 150 and threadedly-engaged by an adjustable stop 156. The exterior wall of the stop 156 is toothed and engaged by a pinion 157 arranged to be driven by a second electric motor 158. It will be seen that operation of the electric motor 158 will adjust the stop 156 axially on the boss 155. The stop 156 is located to be in the path of and, therefore, to be abutted by, the flange 54 on the nut 148.

Referring now to FIG. 3 which shows the electrical circuit for controlling the actuator described above with reference to FIG. 2 being used as a railway brake actuator, the final output member 126 of the actuator is coupled, through a linkage mechanism 160 to a brake block 161 engageable with a railway vehicle wheel 162.

For controlling the brake block 161, there is a brake controller 163 operating the handle 164 of which generates over line 165 a signal indicative of the degree of braking required. This signal is fed to the electric motor 101. Fed back to a comparator 166 in the brake controller 163 over the line 167 from the transducer 121 is a signal indicative of the force being exerted by the spring 115 (FIG. 2).

The pair of contacts 130 are in the circuit 168 of the electrical clutch 104.

Applied over the line 169 to the second electric motor 158, is a signal indicative of the load of the railway vehicle.

The actuator shows in FIG. 2, controlled by its electrical circuit as shown in FIG. 3, operates as follows:

The actuator is shown in FIG. 2 in its "brakes released" condition.

In this condition, the motor 101 is de-energised and its clutch 104 energised by the "making" of the pair of contacts 130 being engaged by the friction ring 127.

The second motor 158 will have been energised over the line 169 to an extent indicative of the lod of the railway vehicle. Such energisation of the motor 158 will have rotated the nut 156 on the threaded boss 155 axially to position it, again, in accordance with the load of the vehicle.

In this condition of the actuator, the brake block 161 will be clear of the wheel 162 by the required amount of normal clearance.

BRAKE APPLICATION

To effect a brake application, the handle 164 of the brake controller is operated to a degree to indicate the degree of braking required. Such operation will generate on line 165 an electrical signal which, firstly, over line 170 will de-energise the clutch 104 and, secondly, will energise the electric motor 101.

De-energisation of the clutch 104 fres the motor 101 for rotation upon its energisation and such consequential rotation will, through pinion 103, rotate the ball-screw tube 106. Rotation of the tube 106 will feed the nut 110 to the left (as viewed in FIG. 2) carrying with it the spring housing (or output member) 117 as, there being little resistance to movement of the housing 117, the effort of the spring 115 will cause the housing 117 axially to move with the nut 110. The housing 117 will also carry with it the final output member 126 and the shaft 131 as these parts will be held together with the spring housing 117 by the spring 135. The movement of the final output member 126 will, through the linkage 160, move the brake block 161 into engagement with the wheel 162.

During this movement of the housing 117, the nut 148 will be caused to rotate on its bearings 151 and 153 (being retained in its axial position as shown in FIG. 1 by the spring 154) as the threaded portion 149 of the tube 113 is drawn through the nut 148.

After the brake block 161 has engaged the wheel 162, resistance to further movement by all those parts previously involved will now suddenly increase as this engagement resists further movement of the final output member 126. As this member 126 tends to stop, continued operation of the electric motor 101 under the influence of the signal being fed over line 165 will, continue the movement of the nut 110. The final output member 126 being temporarily arrested in its movement, the consequent continued movement of the spring housing 117 will collapse the spring 135; the housing 117 being permitted to continue its movement relative to the final output member 126 due to the pin-and-slot connection 123/124 between the tubular extensions 122 and 125 respectively of the housing 117 and the member 126.

As the spring 135 collapses, the shaft 131 being prevented from further axial movement by the arresting of the final output member 126, the shaft 131 will be forced to rotate as the threaded engagement of the housing 117 is forced along the threaded portion 137 of the shaft 131. Rotation of the shaft 131, through its square section portion 138 engaged in the bore 139 of the clutch operating part 140 (which, previously, merely moved axially relative to that part 140) will rotate the clutch operating part 140. Such rotation causes the clutch 141/142/146 to arrest the rotation of the nut 148.

The braking force now starting to be exerted by the brake block 161 on the wheel 163 will build up as the motor 101 is continued to be operated. The continued rotation of the motor 101 will continue to "screw" the nut 110 to the left now to compress the spring 115 causing it to exert a growing output force on the spring housing 117 and, through the spring 135, on the final output member 126. As the spring 135 further compresses under this growing output force, the nut 148 (now being prevented by the clutch 141/142/146 from rotation) will be carried axially to the left with the tube 113 being free to do by virtue of the splined connection of the clutch part 146 to the hub 147 of the nut 148. Such movement of the nut 148 carries its flange 154A towards the stop 156.

The transducer 121 will be registering this growing output force and will be feeding back to the comparator 166 of the brake controller 163, a signal indicative of the value of the force. When this feed-back signal from the transducer is recognised by the comparator as being indicative of the braking force required as indicated by the degree of operation of the handle 164 of the brake controller, the comparator will terminate the signal previously applied over the line 165. Such termination will, firstly, energise the clutch 104 to "lock-in" the braking force being exerted and, secondly, de-energise the motor 101 to prevent any further increase of the braking force.

Clearly, from this "brake applied" condition of the actutor, the braking force exerted can be increased or reduced, by suiable further operation of the handle 164 of the braking controller. Such further operation, for increasing the braking force, will de-energise the clutch 104 and re-energise the motor 101 until the new and higher braking force is exerted and, for reducing the braking force, will merely de-energise the clutch 104 and energise the motor 101 in the reverse direction to allow the spring 115 to re-expand until the braking force (as detected by the transducer 121) has reduced to the new lower value whereupon the clutch 104 willbe re-energised.

It has been assumed in the above-described operation that the braking force called for by operation of the controller has not exceeded that suitable to the loading of the vehicle. Were it to have been otherwise, before the called-for degree of braking had been effected, the flange 154A on the second nut 148 would have engaged the stop 156. Such engagement would have arrested the nut 148 at the permitted maximum level of braking force and, through the tube 113, would have prevented any further movement of the nut 110 and, therefore, any further compression of the spring 115. Hence, the maximum output force permitted to be exerted by the spring 115 on the final output member 126 would have been limited.

BRAKE RELEASE

From the "brake applied" condition of the actuator, the brake is released by appropriate operation of the handle 164 of the brake controller 163. Such operation will, firstly, again de-energise the clutch 104 and, secondly, this time energise the motor 101 for operation in the opposite direction to that in which it was operated to apply the brake. Such reverse operation of the electric motor 101 will "wind-back" the nut 110 to the right thus, initially, allowing the spring 115 to recover until it is again housed by the spring housing 117 when the previously-applied braking force will have been fully recovered. In the process of such recovery, the spring 135 will also have fully recovered rotating the shaft 131 in the direction opposite to its previous rotation and, thereby, restoring the flange 154 to the position which it initially had spaced from the stop 156.

When the braking force has been fully relieved, the rigging spring normally incorporated in the lever system 160 will assist the return of the brake block 161 to its normal clearance from the wheel 162. This will occur as the final output member 126 is withdrawn to its original position, through the pin-and-slot connection 123/124, as the housing 117 is moved back to the right under the influence of the now housed spring 115, by continued rightward movement of the nut 110 as the ball-screw tube 106 continues to be rotated by the motor 101. During this further movement, the shaft 131 will also be returned to the right. However, once the spring 135 has fully recovered upon the braking force been fully relieved, such movement of the shaft 131 is purely axial as there is now no relative movement between the spring housing 117 and the shaft 131. Such mere axial movement of the shaft 131 is accommodated by the square-section end portion 138 of the shaft 31 sliding in the bore 139 in the clutch-operating part 140. Hence, there is no further rotation of part 140 during this phase of the recovery and, therefore, no further axial movement of the second nut 148. The axial movement of the nut 110 relative to the second nut 148 is accommodated by the second nut 148 spinning on its bearings 151 and 153 as the tube 113 of the nut 110 is forced through the second nut 148.

All the above described "brake release" movements continue until the friction ring 127 is moved back by movement of the final output member 126, to "remake" the pair of contacts 130. Upon this occurring, the clutch 104 will be re-energised to "lock" the actuator in the "brakes released" condition and the motor 101 de-energised to cease its operation.

STACK ADJUSTMENT

In the above described operations, it was assumed, as stated, that the original clearance between the brake block 161 and the wheel 162 was that required.

Had this clearance, in fact, been in excess of the required, the following would have occurred:

During the "brake application", because the clearance was greater than that required, the friction ring 127 would have engaged the end wall 127A of the housing 109 before the brake was fully applied. This being so, once the ring 127 was arrested from further leftward movement by this engagement, the continued movement of the final output member 126 would have forced that member 126 through the ring 127 by an extent indicative of by how much the clearance was excessive. Hence, upon the "brake release" operation, as this operation is terminated by the "remaking" of the pair of contacts 130 by their engagement by the friction ring 127, at the end of the "brake release" operation, the clearance between the brake block 161 and the wheel 162 would be restored to that required.

It will be seen, therefore, that the gap between the friction ring 127 and the end wall 127A of the actuator housing 109 is a measure of the required total stroke of the actuator.

We claim:

1. An electric actuator having an output member movable into and out of a force-exerting position, a spring system, electric motor means for moving the output member to and from the force-exerting position thereof and, for when the output member is in that position, controlling the spring system to generate a required variable output force on the output member, and means for withholding the spring system from generating a force on the output member until the output member is determined as being in the force-exerting position thereof.

2. An electric actuator as claimed in claim 1, further comprising a housing which houses the spring system so as to be inoperative on the output member until the output member is determined as being in the force-exerting position thereof.

3. An electric actuator as claimed in claim 2, wherein the output member constitutes a final output member, said actuator further comprising a second output member and a collapsible spring located between final output member and said second output member, collapses of said collapsible spring being indicative of the final output member being in the force-exerting position thereof.

4. An electric actuator as claimed in claim 3, further comprising means responsive to the collapse of the collapsible spring between the two output members for initiating operation of the electric motor to cause the spring system to generate an output force on the second output member for transmission to the final output member.

5. An electric actuator as claimed in claim 4, wherein trapped between the spring and the final output member comprises a control member which is threadedly-engaged with the second output member, such threaded engagement causing relative rotation of the control member and the second output member when the second output member moves relative to the final output member as the spring between them collapses and this consequent relative rotation initiates operation of the electric motor to cause the spring system to generate an output force on the second output member.

6. An electric actuator as claimed in claim 1, wherein the spring system includes a power spring and a control spring, the control spring exerting a force which is detractive from the force exerted by the power spring and the electric motor controlling the force exerted by the control spring and, thereby, the residual force permitted to be exerted by the power spring on the output member as the output force.

7. An electric actuator as claimed in claim 4, wherein the second output member is separate from the housing and the second output member is threadedly-engaged with a part resiliently loaded in a direction tending to clutch said part to the housing to allow transmission of the output force generated by the spring system from the housing through said part to the second output member.

8. An electric actuator as claimed in claim 7, further comprising a second spring for urging, through the second output member and the collapsible spring, the final output member towards the force-exerting position thereof, the second spring being stronger that said collapsible spring.

9. An electric actuator as claimed in claim 8, wherein the part threadedly-engaged with the second output member comprises a nut and means for supporting the nut for rotation relative to the second output member such that the nut normally is held against such rotation but when freed to rotate is rotated by the second spring thereby to move the final output member towards the force-exerting position thereof.

10. An electric actuator as claimed in claim 9, wherein the nut is arranged to be driven by a second electric motor in a direction opposite to that in which said nut is rotated by the second spring, the second electric motor normally being clutched against operation to hold the nut against rotation but being declutched and operable to drive the second output member in a direction to carry, with the second output member, the final output member away from the force-exerting position thereof, and thereby re-compresses the second spring.

11. An electric actuator as claimed in claim 1, wherein the spring system is constituted by a single power spring and the electric motor is arranged to vary the length of the power spring to cause the power spring to exert a correspondingly varying output force.

12. An electric actuator as claimed in claim 9, wherein the housing constitutes the second output member.

13. An electric actuator as claimed in claim 1, wherein the output member constitutes a final output member, said actuator further comprising a second output member and a collapsible spring located between said final output member and said second output member, collapse of said collapsible spring being indicative of the final output member being in its force-exerting position.

* * * * *